US005194146A

United States Patent [19]

Krettek

[11] Patent Number: 5,194,146

[45] Date of Patent: Mar. 16, 1993

[54] CENRIFUGE FILTER WITH CLOSABLE BYPASS

[75] Inventor: Guntram Krettek, Viersen, Fed. Rep. of Germany

[73] Assignee: Dorr-Oliver Incorporated, Milford, Conn.

[21] Appl. No.: 820,106

[22] Filed: Jan. 13, 1992

[51] Int. Cl.[5] ..... B01D 33/11

[52] U.S. Cl. ..... 210/119; 210/123; 210/380.3; 210/403

[58] Field of Search ..... 210/119, 123, 380.1, 210/380.3, 403, 781, 784

[56] References Cited

U.S. PATENT DOCUMENTS 4,101,421 7/1978 Hultsch ..... 210/781

4,184,951 1/1980 Wientjens ..... 210/784

*Primary Examiner*—Ivars Cintins

*Attorney, Agent, or Firm*—Harold M. Snyder

[57] ABSTRACT

A drum centrifuge has a housing, a drum in the housing, an axially extending outer foraminous side wall in the interior of the drum forming an outer chamber, and a transversely extending foraminous end wall in the drum forming a bypass chamber radially inward of the outer chamber. A suspension is fed to the interior of the drum while same is rotating so that the suspension is thrown centrifugally against the outer wall and separates into a radially outer body of filter cake having an inner surface and a radially inner body of liquid sitting on the inner surface. A drainage chamber is formed at the end wall and a drain passage extends between the drainage chamber and the outer chamber while a bypass passage extends between the drain chamber and the bypass chamber. A float valve in the passage is radially displaceable when a liquid level in the passage rises radially inward above a predetermined level between a radially outer position blocking flow through the passage and a radially inner position permitting flow through the passage. A dip tube is radially displaceable in the drain chamber between a radially outer position maintaining the liquid level in the drainage chamber and in the passage radially outward of and below the predetermined level and a radially inner position allowing the liquid level in the drainage chamber and passage to rise radially inward above the predetermined level and thereby open the float valve.

6 Claims, 2 Drawing Sheets

CENRIFUGE FILTER WITH CLOSABLE BYPASS

FIELD OF THE INVENTION

The present invention relates to a centrifuge filter. More particularly this invention concerns such a filter having a bypass passage.

BACKGROUND OF THE INVENTION

A standard drum centrifuge has a housing in which a foraminous drum is rotated at high speed about its axis. A suspension is fed to the interior of the drum so that it is thrown centrifugally against the wall thereof. At first the suspension forms an annular body in the drum having an inner surface centered on the axis, then this annular body stratifies and the liquid phase passes through the drum and the solid phase stays behind on the inner surface of the drum as a filter cake. This inner layer of liquid passes radially outward through the layer of solids until same is substantially dry. As a rule the drum is filled and refilled several times until the filter cake builds up to a desired depth. Then this cake is washed by passing a liquid through it, and then it is centrifuged to an extremely low moisture content. Subsequently a hot gas can be passed through it to further dry it, and finally it is physically stripped out of the drum, same is regenerated, and the cycle is restarted.

It is known to form an end wall of the drum with an axially inwardly open bypass chamber that extends radially inward well past where the inner surface of the thickest filter cake would be. This chamber is separated from the interior of the drum by a mesh or other foraminous wall so that filtrate liquid can pass through it but the solid phase, that is the filter cake, cannot. As described in U.S. Pat. Nos. 4,101,421 and 4,184,951 as well as in European patent application 255,623 filed Jul. 11, 1987 by P. Franzen et al the bypass chamber is provided with its own drain system so that liquid can be drawn out of it independently of the liquid that is drained off outside the foraminous inner wall of the drum.

In this manner it is possible to operate the centrifuge in the normal manner without permitting any liquid to exit the bypass chamber until a fairly thick filter cake has built up. At this time the bypass chamber can be drained to draw off the filtrate liquid sitting atop the inner surface of the filter cake, thus speeding operation by not forcing this liquid to slowly percolate down through the filter cake. Later when the filter cake is being rinsed, the bypass chamber is again closed to ensure that all the rinse liquid passes through the filter cake.

The disadvantage of such as system is that it is fairly complex, what with the two separate drainage systems for the endwall and side-wall filtrate. Since both of these liquids are invariably routed to the same location, the extra cost of the dual drainage system is unwarranted.

OBJECTS OF THE INVENTION

It is therefore an object of the present invention to provide an improved bypass-type drum centrifuge.

Another object is the provision of such an improved bypass-type drum centrifuge which overcomes the above-given disadvantages, that is whose bypass chamber can be drained or blocked, as desired, but using equipment that is fairly simple.

SUMMARY OF THE INVENTION

A bypass-type drum centrifuge according to the invention has a housing, a drum in the housing centered on and rotatable about a drum axis and having an interior, an axially extending outer foraminous side wall in the interior of the drum forming an outer chamber, and a transversely extending foraminous end wall in the drum forming an axially inwardly open bypass chamber radially inward of the outer chamber. A suspension is fed to the interior of the drum while same is rotating so that the suspension is thrown centrifugally against the outer wall and separates into a radially outer body of filter cake having an inner surface and a radially inner body of liquid sitting on the inner surface. A drainage chamber is formed at the end wall and a drain passage extends between the drainage chamber and the outer chamber and a bypass passage extends between the drain chamber and the bypass chamber. A float valve in the passage is radially displaceable when a liquid level in the passage rises radially inward above a predetermined level between a radially outer position blocking flow through the passage and a radially inner position permitting flow through the passage. A dip tube is radially displaceable in the drain chamber between a radially outer position maintaining the liquid level in the drainage chamber and in the passage radially outward of and below the predetermined level and a radially inner position allowing the liquid level in the drainage chamber and passage to rise radially inward above the predetermined level and thereby open the float valve.

This system makes it possible by inwardly displacing the dip tube to open up the bypass valve during normal operation and drain off filtrate liquid both through the filter cake and through the bypass chamber. When the filter cake is being rinsed, however, the dip tube is moved radially outward to close the valve and force all of the rinse liquid through the filter cake. In addition at the start of a filtering operation the bypass chamber can be cut out so that a filter cake can be allowed to build up. Once a sufficiently thick filter cake has been formed, the bypass valve is opened to speed the operation. Once the maximum filter-cake thickness is obtained, the bypass chamber is again shut off for the rinsing operation. For drying the bypass chamber is again opened up.

According to the invention the bypass passage extends radially and is formed with at least one seat. The float valve includes a valve body radially displaceable into and out of sealing engagement with this seat. The drum is provided with a radially extending guide on which the valve body is radially slidable. When it slides radially outward it fits tightly into the seat and effectively blocks flow past it.

The housing of this invention is provided with a stop limiting outward displacement of the valve body. The bypass chamber is generally annular and axially open. It can be formed as an annularly continuous space, or as an annular sequence of interconnected spaces.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
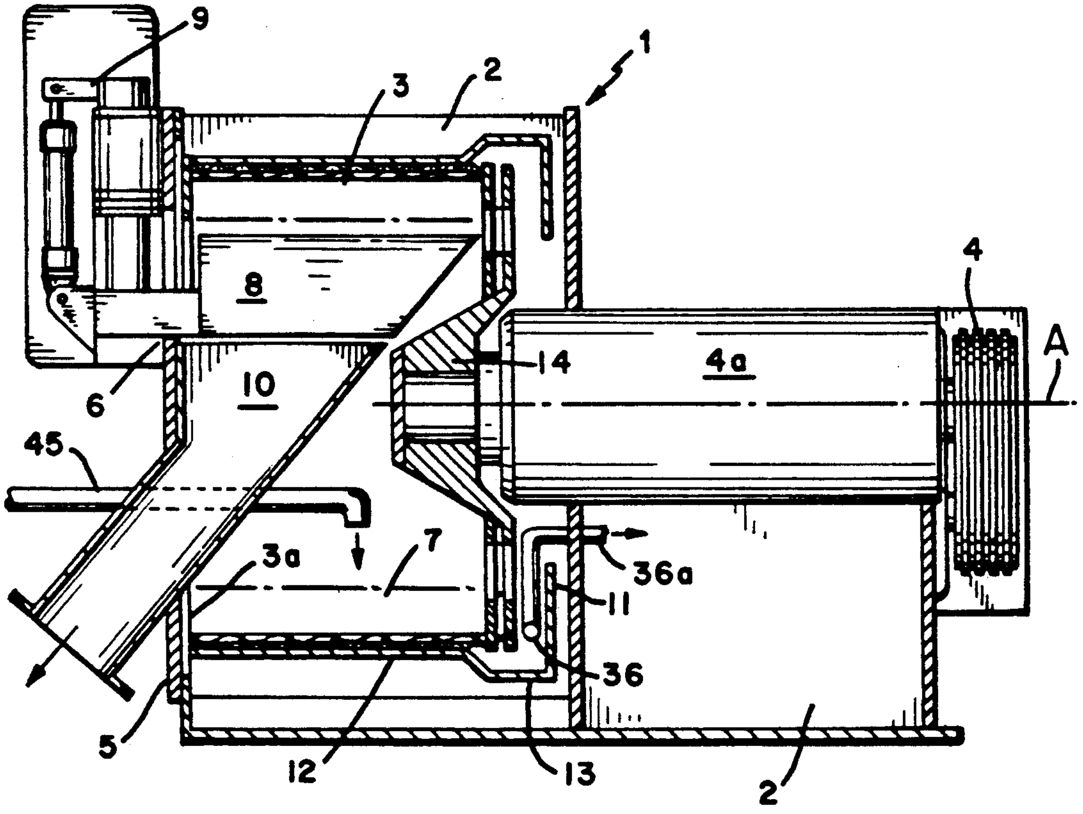
FIG. 1 is a partly schematic side view of the centrifuge filter according to this invention.

As seen in FIG. 1 a drum centrifuge 1 has a normally stationary housing 2 in which a drum 3 is rotatable about a horizontal axis A. A drive 4 is connected via a shaft 4a to an end wall 14 of the drum to rotate it. The opposite end of the drum 3 is closed by an annular wall through which extends a chute or conduit 10 for carrying away solids and a pipe 45 for introducing into the drum 3 a suspension to be separated into a liquid filtrate phase and a solid phase. The end wall 5 has a hole 6 through which extends a solids scraper 8 that can be moved radially by an actuator 9 to scrape off a filter cake 7 and drop it into the upper end of the conduit 10.

Figure 2:
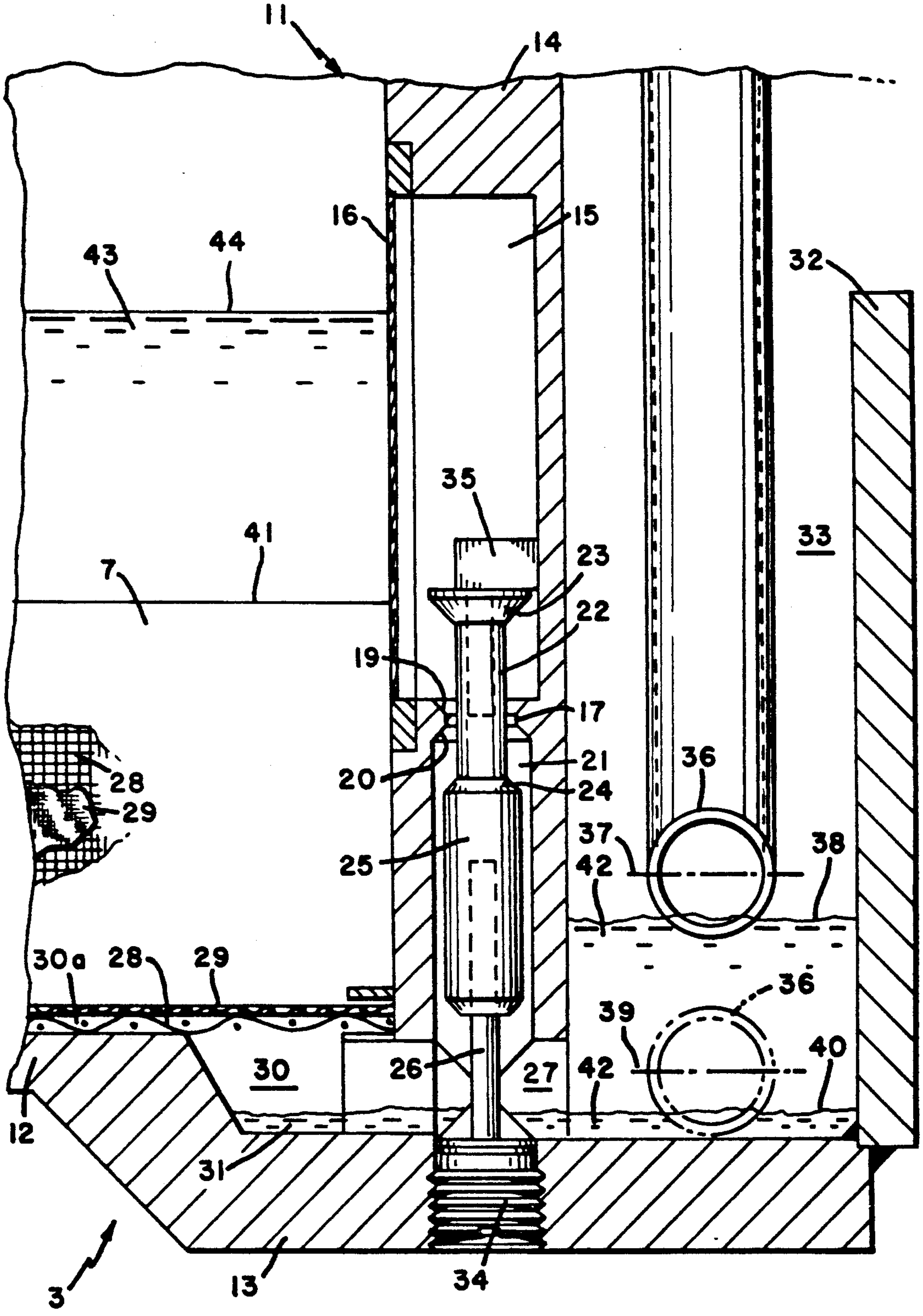
FIG. 2 is a large-scale view of a detail of FIG. 1.

As best seen in FIG. 2 the drum 3 also has a basically cylindrical side wall 12 centered on the axis A and is formed adjacent the rear end wall 14 with a radially outward part 13 in which is provided a separator 11. Internally the drum 3 is provided with a cylindrical mesh 28 supporting a filter cloth 29 and defining an outer chamber 30a that opens into a chamber 30 from which liquid filtrate such as shown at 31 can be drawn. In addition an end partition 32 defines a drain chamber 33 in which a standard radially displaceable dip tube 36 is radially displaceable between a radially inner position 37 establishing a liquid level 38 of liquid 42 in the chamber 33 and a radially outer level 39 establishing a shallower liquid level 40. A passage 27 connects the chamber 33 to the chamber 30.

In addition the end wall 14 is formed radially inward of the chamber 30 with an annular and axially inwardly open bypass chamber 15 that is covered by a mesh and that extends radially between an outer edge outside an interface or inner surface 41 of the body 7 of filter cake and an inner edge inward of an inner surface 44 of a body 43 of filtrate liquid sitting atop the filter cake 7.

The bypass chamber 15 is connected via a bypass passage 21 to the passage 27 that opens into the chamber 33. The radially inner end of the passage 21 is formed with a mouth 17 forming a radially inwardly open seat 19 and a radially outwardly open frustoconical seat 20 engageable with respective valve formations 23 and 24 of a valve member 22 radially displaceable on a guide 26 carried on a plug 34 set in the wall 13. Inwardly a stop 35 carries another such guide and serves to limit inward travel of the valve body 22. The valve body 22 further carries a float body 25 in the passage 21.

In the illustrated position of the valve body 22 liquid can flow from the chamber 15 to the chamber 33 freely. When, however, the valve formation 23 is sitting atop the valve seat 19, such flow is completely blocked.

The radial position of the dip tube 36 determines the radial position of the valve body 22 by filling and emptying the passage 21 and thereby radially moving the float 25. Thus in the outer position 37 shown in solid lines the liquid is at a level 38 which lifts the float and opens the valve formed by the element 22. When the dip tube 35 is moved radially outward to the position 39 with a low liquid level 40, however, the float 25 and valve body 22 move radially outward to close the seat 19.

It is therefore possible to control opening and closing of the valve 22 simply by controlling the liquid depth in the chamber 33. If the system is running dry and it is necessary to open the valve 22, it is possible to do so by introducing liquid into the chamber 33, for instance through pipe 45.

I claim:

1. A bypass-type drum centrifuge comprising:
a housing;
a drum in the housing centered on and rotatable about a drum axis and having an interior;
an axially extending outer foraminous side wall in the interior of the drum forming an outer chamber;
a transversely extending foraminous end wall in the drum forming a bypass chamber radially inward of the outer chamber;
means for feeding a suspension to the interior of the drum while same is rotating so that the suspension is thrown centrifugally against the outer wall and separates into a radially outer body of filter cake having an inner surface and a radially inner body of liquid sitting on the inner surface;
structure in the drum forming a drainage chamber at the end wall and a drain passage between the drainage chamber and the outer chamber;
means including a bypass passage extending between the drain chamber and the bypass chamber and a float valve in the bypass passage radially displaceable when a liquid level in the passage rises radially inward above a predetermined level between a radially outer position blocking flow through the passage and a radially inner position permitting flow through the passage; and
means including a dip tube radially displaceable in the drain chamber between a radially outer position maintaining the liquid level in the drainage chamber and in the passage radially outward of and below the predetermined level and a radially inner position allowing the liquid level in the drainage chamber and passage to rise radially inward above the predetermined level and thereby open the float valve.

2. The bypass-type drum centrifuge defined in claim 1 wherein the bypass passage extends radially and is formed with at least one seat, the float valve including a valve body radially displaceable into and out of sealing engagement with the seat.

3. The bypass-type drum centrifuge defined in claim 2 wherein the drum is provided with a radially extending guide on which the valve body is radially slidable.

4. The bypass-type drum centrifuge defined in claim 2 wherein the housing is provided with a stop limiting inward displacement of the valve body.

5. The bypass-type drum centrifuge defined in claim 1 wherein the bypass chamber is generally annular and axially open.

6. A bypass-type drum centrifuge comprising:
a housing;
a generally cylindrical drum in the housing centered on and rotatable about a drum axis and having an interior;
an axially extending generally cylindrical outer foraminous side wall in the interior of the drum forming an annular outer chamber;
a transversely extending foraminous end wall in the drum forming an axially inwardly open bypass chamber radially inward of the outer chamber;
means for feeding a suspension to the interior of the drum while same is rotating so that the suspension is thrown centrifugally against the outer wall and separates into a radially outer body of filter cake having an inner surface and a radially inner body of liquid sitting on the inner surface;
structure in the drum forming an annular and radially inwardly open drainage chamber at the end wall, a drain passage communicating between the drainage chamber and the outer chamber, and a bypass passage extending between the drain chamber and the bypass chamber;

valve means provided with a float in the bypass passage radially displaceable when a liquid level in the passage rises radially inward above a predetermined level between a radially outer position blocking flow through the passage and a radially inner position permitting flow through the passage; and means including a dip tube radially displaceable in the drain chamber between a radially outer position maintaining the liquid level in the drainage chamber and in the passage radially outward of and below the predetermined level and a radially inner position allowing the liquid level in the drainage chamber and passage to rise radially inward above the predetermined level and thereby open the float valve.

* * * * *

UNITED STATES PATENT AND TRADEMARK OFFICE

CERTIFICATE OF CORRECTION

PATENT NO. : 5,194,146

DATED : 16 March 1993

INVENTOR(S) : GUNTRAM KRETTEK

It is certified that error appears in the above-identified patent and that said Letters Patent is hereby corrected as shown below:

On the title page, insert the following:

--[30] Foreign Application Priority Data

January 19, 1991 [DE] Germany P4101498.7--

Signed and Sealed this

Twenty-third Day of November, 1993

Attest:

BRUCE LEHMAN

*Attesting Officer* *Commissioner of Patents and Trademarks*